UNITED STATES PATENT OFFICE.

JAMES C. ANDERSON, OF HIGHLAND PARK, ILLINOIS.

METHOD OF ENAMELING OR INCRUSTING BRICKS, &c.

SPECIFICATION forming part of Letters Patent No. 406,688, dated July 9, 1889.

Application filed April 24, 1889. Serial No. 308,451. (No specimens.)

*To all whom it may concern:*

Be it known that I, JAMES C. ANDERSON, a citizen of the United States, residing at Highland Park, in the county of Lake and State of Illinois, have invented new and useful Improvements in the Method of Enameling or Incrusting Brick and other Clay Articles; and I do hereby declare the following to be a full, clear, and exact description of said invention.

My invention relates to a new and useful method of enameling bricks; and it consists in an intercrusting composed of a union of enamel and pure metals applied to the surface of the brick or other clay articles after they are molded into form, and afterward burned therewith, the process being completed in the first or initial firing of the same, whereby a union is effected between said enamels and metals applied to the surface of the brick and the aluminum of the clay body to which the compound of enamels and metals is applied, so that a complete enameled inter and over crusting is produced on the surface of the brick, tile, or other clay article, and at the same time an engraftment from such overcrusting extends into the clay body as a fixed part thereof.

In practicing my invention I use the whole range of enamels either singly or in combination, combined with disintegrated or finely-divided metal in its pure state, or alloys of the pure metals, selecting such of them as are best adapted to produce the desired tints or shades of color.

In carrying out my invention the bricks, blocks, or tiles are by preference molded in the usual manner practiced by me in the manufacture of pressed building bricks and blocks molded from dry clay, as described in my various patents granted to me for such purposes. In the case of bricks, blocks, or tiles it is understood that the articles to be coated are first molded or pressed into form in the usual manner ready to be placed in kilns for burning, and while in this state before any burning has taken place, or while they are being placed in the kiln, I take the enamels or compounds of the same in a finely-divided or powdered condition, mixed with any of the pure metals or compounds of the same, which are also in a finely-divided, comminuted, or powdered condition and sprinkle the same over the surface of the brick to be incrusted or enameled. In some cases where the article has uneven surfaces and will not retain the powdered materials, I coat the article with shellac or other adhesive material, which will cause the powdered material to retain its place until firmly engrafted thereon by the action of the heat of the kiln. After the articles are thus coated they are placed in a suitable kiln, where they are burned to the pottery point, which causes the powdered or granulated materials placed thereon to become fused and incorporated with the clay body as an integral part thereof. It may be proper in this connection to state that the said crusting or intercrusting is rooted to and into the clay body, and is in fact a part of the incrustation growing out therefrom, which is caused by the clay body giving up its aluminum metal to the compound of metals and enamels applied to the surface under the influence of the affinity of the metals for each other when subjected to the heat of the kiln, and the incrusting therefore upon the surface of the brick not only consists of the metals and enamels applied to the surface thereof, but in union with aluminum metals, which is a part of the incrustation. It will be understood in this connection that the metals which are applied to the surface of the article to be coated not only serve as a vehicle to extract the aluminum from the clay body of the article, but said metals impart various colored tints, thus producing a new article of manufacture—viz., an enamel covering consisting of various colors, shadings, and blendings of colors in the same article.

While I have described the application of the metals to the brick body to be fused as integral parts in the initial burning as the best mode known to me for producing the incrusted bricks, blocks, or tiles, yet I do not wish to be understood as confining myself to the initial burning. A partial result may be obtained in certain conditions in a secondary firing of the articles.

What I claim is—

An improvement in the art of manufacturing intercrusted bricks, tiles, and other clay articles, which consists in applying a composition of finely-divided or comminuted enamel and pure metals to the articles while the same are in a green or unburned state, and in then burning said articles to the pottery point to fuse the enamel and metals and cause them to form an incrustation of enamel integral with the main body of the article.

In testimony whereof I affix my signature in the presence of two subscribing witnesses.

J. C. ANDERSON.

Witnesses:
　　J. F. ANDERSON,
　　EDW. B. PATCH.